July 7, 1970  T. W. STONE  3,519,860
ARRANGEMENT FOR ANCHORING THE LEADS IN DYNAMOELECTRIC MACHINE
Filed April 22, 1968

Inventor
Thomas W. Stone
By Joseph A. Lemignani
Attorney

United States Patent Office

3,519,860
Patented July 7, 1970

3,519,860
ARRANGEMENT FOR ANCHORING THE LEADS IN DYNAMOELECTRIC MACHINE
Thomas W. Stone, Owosso, Mich., assignor to Controls Company of America, Melrose Park, Ill., a corporation of Delaware
Filed Apr. 22, 1968, Ser. No. 723,152
Int. Cl. H02k 11/00
U.S. Cl. 310—71                4 Claims

ABSTRACT OF THE DISCLOSURE

Coil leads are positioned in the corners of the coil slots formed at the juncture of the inner coil slot walls and the poles. The coils are wound in place on the poles over the lead wires secured anchoring the lead wires in the corners. The coil ends are connected to the lead wires.

BACKGROUND OF INVENTION

Field of invention

This invention relates to dynamoelectric machines and, more particularly, to a method of attachment of coil end lead wires in such machines and also to the machine resulting from that method.

Description of prior art

Common practice is to provide some form of termination for the coil ends in an electric motor, or dynamoelectric machinery in general. Most commonly, lead wires are attached to the coil ends and the lead wires are then connected, for example, to the stator core to securely anchor the lead wires. The connection is also made in a manner to obtain necessary strain relief. Heretofore accepted practices of fastening the lead wires and in a manner to obtain strain relief, have usually required additional elements such as lacing cord, tape, tubes or wedges in the coil slots, etc. These prior practices are not readily adapted to automated procedures and are costly as requiring considerable hand labor in the lead attachment for strain relief as well as in attaching the coil ends to the lead wire and, furthermore, in requiring the aforementioned additional elements. Also, additional elements, such as the wedges, tubes, etc., obstruct the coil slot openings and interfere with air flow where such flow is desired.

SUMMARY OF INVENTION

An object of this invention is to provide a generally simplified method of securely fastening coil leads which is especially adapted to automated procedures, does not require any additional structural elements, an achieves optimum strain relief.

To achieve this another objects, this invention proposes to fasten coil leads in a core of a dynamoelectric machine by positioning the leads adjacent one of the core poles and assembling the coils onto the poles in such a manner that the leads are entrapped by the coils in an assembly including the core, coils and leads.

DESCRIPTION OF PREFERRED EMBODIMENT

Figure 1:
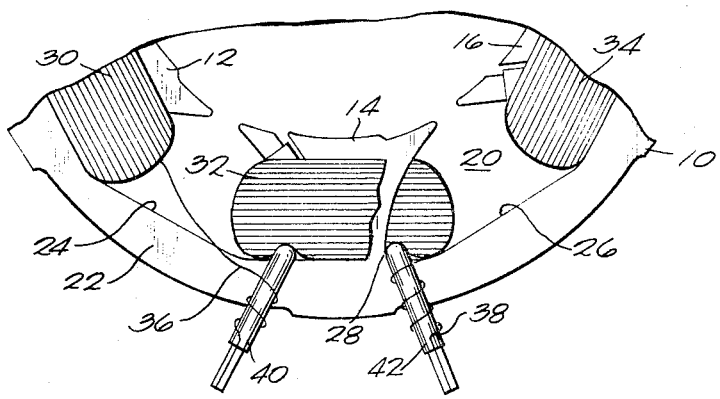
FIG. 1 is an end view of a portion of a motor stator illustrating the relationship between the leads and coils in the stator.
Figure 2:
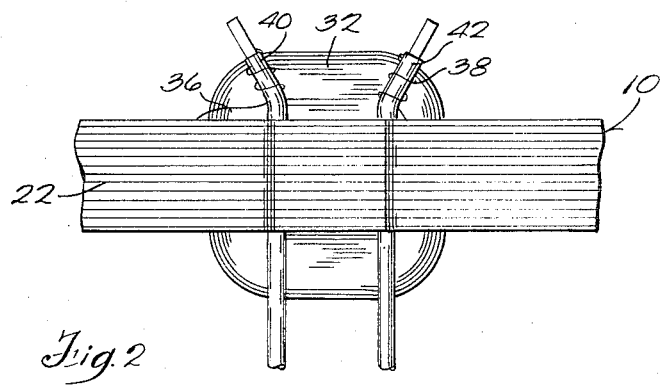
FIG. 2 is a bottom plan view of the stator portion of FIG. 1.

With particular reference to the drawing, the invention is illustrated in connection with a stator for an electric motor, in this case a shaded pole motor.

The stator core 10 is constructed of a number of stacked laminations as is conventional practice. The assembled core includes a plurality of poles only three of which, 12, 14 and 16, are shown. The poles are angularly spaced with respect to each other and slot openings are formed between adjacent poles, for example, slot openings 18 and 20 in FIG. 1. The stator core includes an outer continuous ring portion 22 from which poles 12, 14 and 16 project. The ring portion defines inner slot walls 24 and 26 between adjacent poles 12, 14 and 14, 16. Corners are provided in the slot openings at the juncture between the inner slot walls 24, 26 and poles 12, 14 and 16. The corners are identical at each of the poles and one such corner 28 is illustrated in connection with pole 14 in FIG. 1.

The general practice is to wind coils on the poles, in the drawing coils 30, 32 and 34 are shown as having been wound on poles 12, 14 and 16 respectively. Coil ends 36 and 38 are left after the winding operation and it is necessary to fasten these coil ends to a terminal member for connection to an external electrical source and in a manner to provide strain relief for the coil ends and the terminal connections. As stated above, the general practice is to provide lead wires which are generally heavier than the coil ends. The lead wires are electrically connected to the coil ends and the lead wires are then connected in the stator core. This invention proposes as a solution to this problem of fastening the coil ends to fasten, or entrap, the lead wires in a core assembly as the coils are assembled onto the poles.

As illustrated, lead wires 40, 42 are positioned in the corners formed at the juncture between inner slot walls 24 and 26 and pole 14. With the lead wires so positioned, the coils are wound on the poles. The coils engage and clamp the lead wires in the corners to securely anchor the lead wires in a core assembly including the laminated core, the coils and the lead wires. With this arrangement, the lead wires are positively held in engagement with the core, at this point it should be noted that the term "core" is used in a broad sense to encompass both the ring and pole portions as being a part of the core. Coil ends 36 and 38 are electrically connected to lead wires 40 and 42. With this arrangement, the lead wires are securely clamped to the stator core by means of a relatively simple technique, without requiring any additional elements and in a manner which provides the necessary strain relief.

The leads 40 and 42 project from both axial ends of the stator core to facilitate connection of the coil ends and also to expose the leads for convenient connection to an external terminal source.

Although but one embodiment of the present invention has been illustrated and described it will be apparent to those skilled in the art that various changes and modifications may be made therein without departing from the spirit of the invention or from the scope of the appended claims.

I claim:
1. A dynamoelectric machine comprising, in combination,
   a core having poles
   leads adjacent at least one of said poles and in engagement with said core,
   coils surrounding said poles engaging said leads thereby entrapping and anchoring said leads in a core assembly including said core, coils and leads,
   and the ends of said coils electrically connected to said leads.
2. The dynamoelectric machine of claim 1 wherein said leads engage said core,
   and said coils hold said leads in engagement with said core.

3. A dynamoelectric machine comprising, in combination,
  a core having poles, coil slots between adjacent poles, and having inner slot walls from which said poles project,
  leads adjacent at least one of said poles and positioned in engagement with said inner slot wall,
  coils surrounding said poles engaging said leads and entrapping said leads in a core assembly including said core, coils and said leads, said coils holding said leads against said inner slot walls,
  and the ends of said coils electrically connected to said leads.

4. The dynamoelectric machine of claim 3 wherein said leads are positioned in corners formed at the juncture of at least one of said poles and said inner slot walls,
and said coils hold said leads in said corners.

References Cited

UNITED STATES PATENTS

| 2,872,599 | 2/1959 | De Young | 310—71 |
| 2,961,556 | 11/1960 | Vance | 310—258 |
| 3,027,475 | 3/1962 | Gaudry | 310—214 |

FOREIGN PATENTS

| 927,956 | 6/1963 | Great Britain. |

MILTON O. HIRSCHFIELD, Primary Examiner

R. SKUDY, Assistant Examiner